US008144842B2

(12) United States Patent (10) Patent No.: US 8,144,842 B2
Wilson et al. (45) Date of Patent: Mar. 27, 2012

(54) UNIFIED MESSAGING GATEWAY DEVICE FOR PROVIDING OPERATION DURING A NETWORK FAILURE

(75) Inventors: Michael Geoffrey Andrew Wilson, Sammamish, WA (US); Clifford Didcock, Sammamish, WA (US); David Andrew Howell, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1507 days.

(21) Appl. No.: 11/608,598

(22) Filed: Dec. 8, 2006

(65) Prior Publication Data

US 2008/0137817 A1 Jun. 12, 2008

(51) Int. Cl.
*H04M 1/64* (2006.01)
(52) U.S. Cl. ............ 379/88.22; 370/352; 370/353; 379/70; 379/88.17; 379/201.01; 455/412.1; 709/201; 709/205; 709/221; 709/224
(58) Field of Classification Search .......... 370/259–271, 370/351–356; 379/67.1–88.28, 201.01; 455/412.1–417; 709/201–207, 217–244; 348/14.01–14.16
See application file for complete search history.

(56) References Cited

U.S. PATENT DOCUMENTS

| | | | | |
|---|---|---|---|---|
| 5,802,466 A | * | 9/1998 | Gallant et al. | 455/413 |
| 5,963,618 A | * | 10/1999 | Porter | 704/270.1 |
| 6,282,192 B1 | | 8/2001 | Murphy et al. | 370/352 |
| 6,295,552 B1 | * | 9/2001 | Shibata | 709/206 |
| 6,339,594 B1 | * | 1/2002 | Civanlar et al. | 370/352 |
| 6,411,685 B1 | * | 6/2002 | O'Neal | 379/88.14 |
| 6,459,776 B1 | * | 10/2002 | Aktas et al. | 379/88.13 |
| 6,529,500 B1 | * | 3/2003 | Pandharipande | 370/352 |
| 6,721,398 B1 | | 4/2004 | Pitcher | 379/88.13 |
| 6,728,357 B2 | | 4/2004 | O'Neal et al. | 379/201.04 |
| 6,763,226 B1 | | 7/2004 | McZeal, Jr. | 455/90.2 |
| 6,868,144 B2 | | 3/2005 | Skladman et al. | 379/88.13 |
| 6,987,840 B1 | * | 1/2006 | Bosik et al. | 379/88.17 |
| 7,095,733 B1 | | 8/2006 | Yarlagadda et al. | 370/352 |
| 7,751,537 B2 | * | 7/2010 | Poustchi et al. | 379/88.18 |
| 2001/0003202 A1 | | 6/2001 | Mache et al. | |

(Continued)

FOREIGN PATENT DOCUMENTS

WO WO 2005/060226 A1 6/2005

OTHER PUBLICATIONS

"Converged Voice, Video, and Data Solution", Solution Blueprint-Telecommunications, 2002, 18 pages, http://www.netcentrex.com.

(Continued)

*Primary Examiner* — Hemant Patel
(74) *Attorney, Agent, or Firm* — Woodcock Washburn LLP

(57) ABSTRACT

A Unified Messaging (UM) gateway device located at a branch office of a UM system manages calls if the network connecting the branch office to a UM server of the UM system is unavailable. The UM gateway device contains relatively simple hardware and software as compared to the hardware and software of a UM server. The UM gateway device provides call answering functionality, in the absence of the UM server. In various configurations, the UM gateway device provides access to mailboxes, manages incoming calls, provides an outgoing message (e.g., an announcement or prompt), provides an indication where the called-for person can be reached, and, when the network becomes available, returns management of incoming calls to the UM server and/or handles incoming calls in conjunction with the Unified Messaging server.

16 Claims, 4 Drawing Sheets

U.S. PATENT DOCUMENTS

| | | | |
|---|---|---|---|
| 2001/0056348 A1* | 12/2001 | Hyde-Thomson et al. | 704/260 |
| 2002/0176374 A1* | 11/2002 | Lee et al. | 370/260 |
| 2002/0186828 A1* | 12/2002 | Bushnell | 379/211.02 |
| 2003/0165231 A1* | 9/2003 | Singh et al. | 379/265.09 |
| 2004/0114515 A1* | 6/2004 | Kim | 370/230 |
| 2005/0041787 A1* | 2/2005 | Casey et al. | 379/88.18 |
| 2005/0157708 A1* | 7/2005 | Chun | 370/356 |
| 2006/0083358 A1 | 4/2006 | Fong et al. | |
| 2007/0036291 A1* | 2/2007 | Graham | 379/88.13 |
| 2007/0211868 A1* | 9/2007 | Banda et al. | 379/67.1 |

OTHER PUBLICATIONS

"IF-104 VoIP Gateway High Density Voice Shaping VoIP Gateway", Inter-Fone (A Revolution in VoIP), Inter-Fone, 4 pages, http://www.inter-fone.com.

"TERAVoice Server 2004 is Released!", 2005, http://www.terasens.com/products/teravoice, 2 pages.

"VOIP in the Enterprise", WindowsNetworking.com, 2006, http://www.windownetworking.com, 3 pages.

* cited by examiner

UNIFIED MESSAGING GATEWAY DEVICE FOR PROVIDING OPERATION DURING A NETWORK FAILURE

TECHNICAL FIELD

The technical field relates generally to computing systems and more specifically to managing calls in a unified messaging system when a network normally in communication with the unified messaging system is unavailable.

BACKGROUND

A centralized Unified Messaging Voice Mail system includes a Unified Messaging server and several protocol converters coupled via a wide area network (WAN). Typically, the Unified Messaging server is located at a data center and the protocol converters are located at respective branch offices. Each protocol converter provides protocol conversion between circuit-switched phone calls from the branch office telephone switch (e.g., PBX) and Voice over IP (VoIP) VoIP protocols over the IP network. A problem with typical Unified Messaging Voice Mail systems is that a call will not be answered if the WAN is unavailable at the time the gateway receives the call.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A Unified Messaging system comprises a one or more Unified Messaging (UM) gateway device located at a branch office. The UM gateway device is configured to handle calls if the network connecting the branch office to the Unified Messaging server is unavailable. Upon an indication that the network is unavailable, the UM gateway device manages incoming calls. In various configurations the UM gateway device can: provide a prerecorded message to incoming callers; record messages from incoming callers; record messages from incoming callers until a predetermined number of calls are recorded or until storage for recorded data is unavailable, and thereafter provide a prerecorded message to incoming callers, provide an indication (e.g., a phone number, an email address) where the called-for person may be reached; or a combination thereof. In an example configuration, the UM gateway device provides recorded audio messages to an email server. Upon an indication that the network is available, the UM gateway device hands off processing of incoming calls to the Unified Messaging server, or handles incoming calls in conjunction with the Unified Messaging server. In an example embodiment, upon an indication that the network is available, the gateway is configured to deliver all recordings queued during the network outage.

BRIEF DESCRIPTION OF THE DRAWINGS

The foregoing summary, as well as the following detailed description, is better understood when read in conjunction with the appended drawings. For the purpose of illustrating a UM gateway device, there is shown in the drawings exemplary constructions thereof, however, a UM gateway device is not limited to the specific methods and instrumentalities disclosed.

DETAILED DESCRIPTION OF ILLUSTRATIVE EMBODIMENTS

A Unified Messaging (UM) system utilizes a relatively simple UM gateway device located at each remote location to manage incoming calls when the network connecting a remote location to a UM server of the UM system is unavailable. The UM gateway device provides call answering functionality, in the absence of the UM server. In an example configuration, the UM gateway device contains relatively simple hardware and software as compared to the hardware and software of a UM server. When the network is unavailable, the UM gateway device manages incoming calls, provides outgoing messages (e.g., prompts or announcements), provides an indication where the called-for person can be reached, provides access to mailboxes if an alternate communications means is available (e.g., a local intra-email service), and, when the network becomes available, returns management of incoming calls to the UM server. In an example configuration, the UM gateway device provides a simple greeting audio message and records the caller's message.

Figure 1:
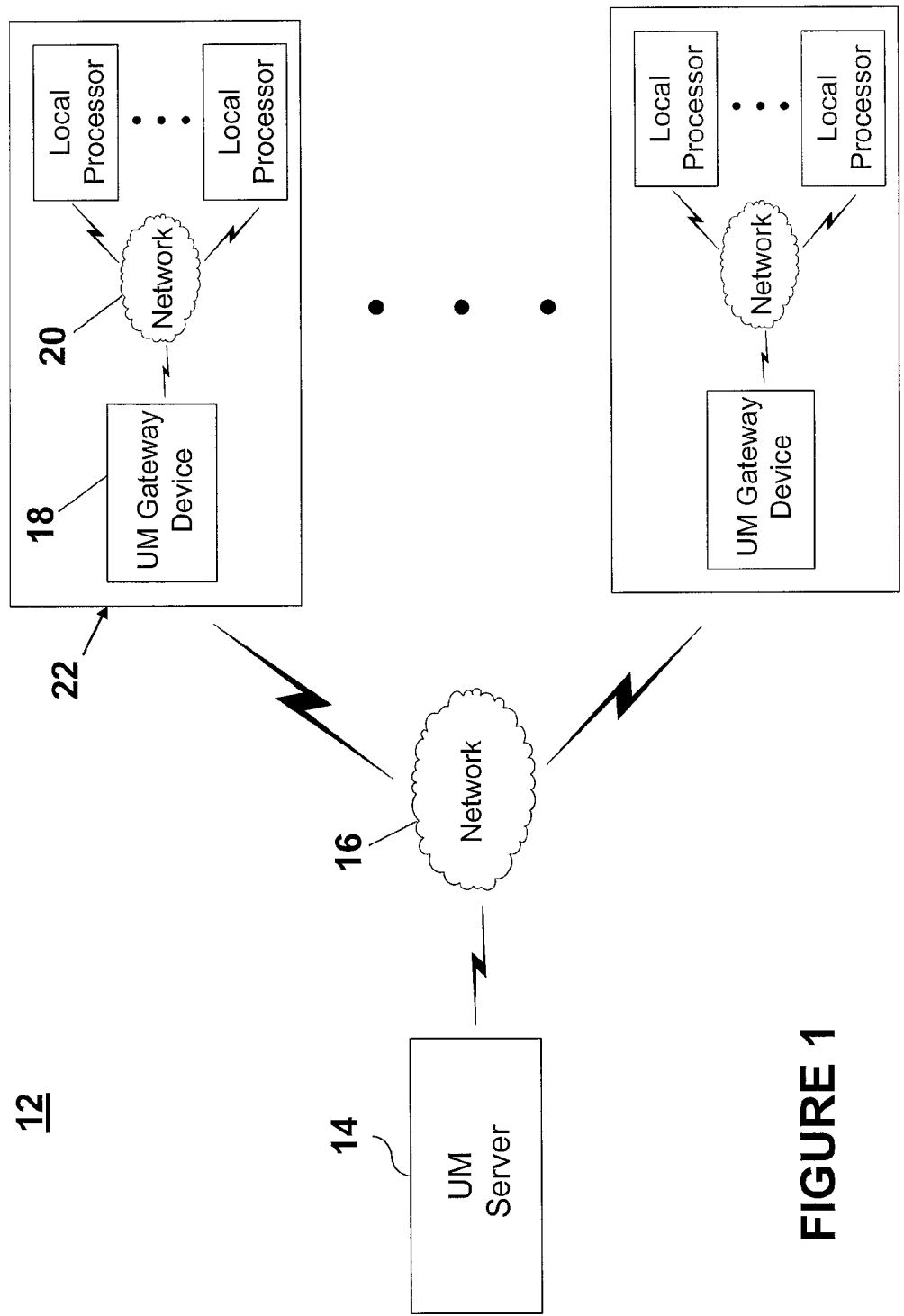
FIG. 1 is an illustration of a UM system comprising a UM server, a network, and at least one UM gateway device.

FIG. 1 is an illustration of a UM system 12 comprising a UM server 14, a network 16, and at least one UM gateway device 18. Each UM gateway device is located at a remote location 22 (remote with respect to other remote locations). Each remote location 22 comprises a UM gateway device 18. The configurations of individual remote locations can vary. Generally, however, a remote location can comprise a network, or the like, 20 connecting the UM gateway device 18 to a local processor or processors. Only one UM gateway device 18, local network 20, and remote location 22 are labeled as such in FIG. 1 for the sake of simplicity. In an example embodiment, the network 16 comprises a wide area network (WAN), the remote location(s) 22 comprises a branch office(s) of the UM system 12, and the network 20 comprises a local area network(s) (LAN), such as corporate LAN or the like.

The UM server 14 integrates various streams of information, such as email messages, fax messages, voice messages, audio messages, and/or video messages, for example, and makes the information available to the appropriate remote locations 22. In an example configuration, information is provided by the UM server 14, via the network 16, to the remote location 22. The network 16 can comprise any appropriate link between the UM server 14 and a remote location 22, such as a wide area network (WAN), a local area network (LAN), an IP network, the internet, or the like, for example. The UM server 14 can be coupled to the remote location 22 wirelessly, via hard wire, or a combination thereof.

Each remote location 22 comprises one or more UM gateway devices 18. In an example embodiment, the UM gateway device is connected to a local processor, or local processors, via the local network 20. The local network 20 can comprise any appropriate link between the UM gateway device 18 and a local processor, such as LAN, a WAN, an IP network, the internet, or the like, for example. The UM gateway device 18 can be coupled to a local processor wirelessly, via hard wire, or a combination thereof.

When the network 16 is available, the UM gateway device 18 performs protocol conversion. Protocol conversion comprises converting information received from the UM server 14 via the network 16 to a form compatible with the telephone equipment located at the remote location 22. Protocol conversion also includes converting information received from the remote location 22, such as from a PBX for example, to a form compatible with the network 16 and the UM server 14. For example, the UM gateway device can provide protocol conversion between circuit switched phone calls from a remote location 22 telephone switch (e.g., a PBX system) and Voice over IP (VOIP) protocols over the network 16.

When the network 16 is unavailable, the UM gateway device 18 switches from performing protocol conversation, referred to as protocol conversion mode, to managing incoming calls, referred to a call management mode. The network 16 can become unavailable, due to a power outage, a hardware failure, a software failure, or a combination thereof for example. The UM gateway device 18 can detect that the network 16 is unavailable via any appropriate mechanism, such as by monitoring a voltage level(s), monitoring an electrical current level(s), analyzing information received from the network 16, analyzing periods of inactivity, receiving a indication from a source other than the network 16 (e.g., receive signal from a system administrator of the local network 20, for diagnostics, testing, maintenance, or the like), or a combination thereof for example.

In the call management mode, the UM gateway device 18 receives incoming calls and can respond in various ways to the incoming calls. The UM gateway device 18 can record a message indicative of the incoming call and/or provide a predetermined message (e.g., prompt or announcement) in response to the incoming call. For example, the UM gateway device 18 can record an audio message provided by a caller of an incoming call and/or can record a fax message received from an incoming call. In an example embodiment, the UM gateway device 18 provides a message indicating that the network 16 is unavailable. In another example embodiment, the UM gateway device 18 provides an indication where the called-for person can be reached. For example, the UM gateway device 18 can provide a message indicating another telephone number, an email address, or a combination thereof. The UM gateway device 18 also can store messages for subsequent retrieval.

In an example embodiment, the UM gateway device 18 stores messages until memory is no longer available, until a predetermined period of time has expired, until a message size threshold has been exceeded, and/or until a predetermined number of messages have been received. Thereafter, the UM gateway device 18 provides a message that the network 16 is unavailable (e.g. down) and/or an indication where the called-for individual can be reached. In another example embodiment, the UM gateway device 18 stores messages for a predetermined number of calls, or for a predetermined amount time, and thereafter provides a message that the network 16 is unavailable and/or an indication where the called-for individual can be reached.

Upon the network 16 becoming available, the UM gateway device 18 submits all stored messages for delivery to the UM server 14 and converts from call management mode to protocol conversion mode. The UM server resumes the role of managing messages. If the UM gateway device 18 stored messages while in the call management mode, the stored messages are provided to the UM server when converting to the protocol conversion mode (or appropriately thereafter). The UM gateway device 18 also can provide stored audio message to an email server when converting to the protocol conversion mode (or appropriately thereafter).

Figure 2:
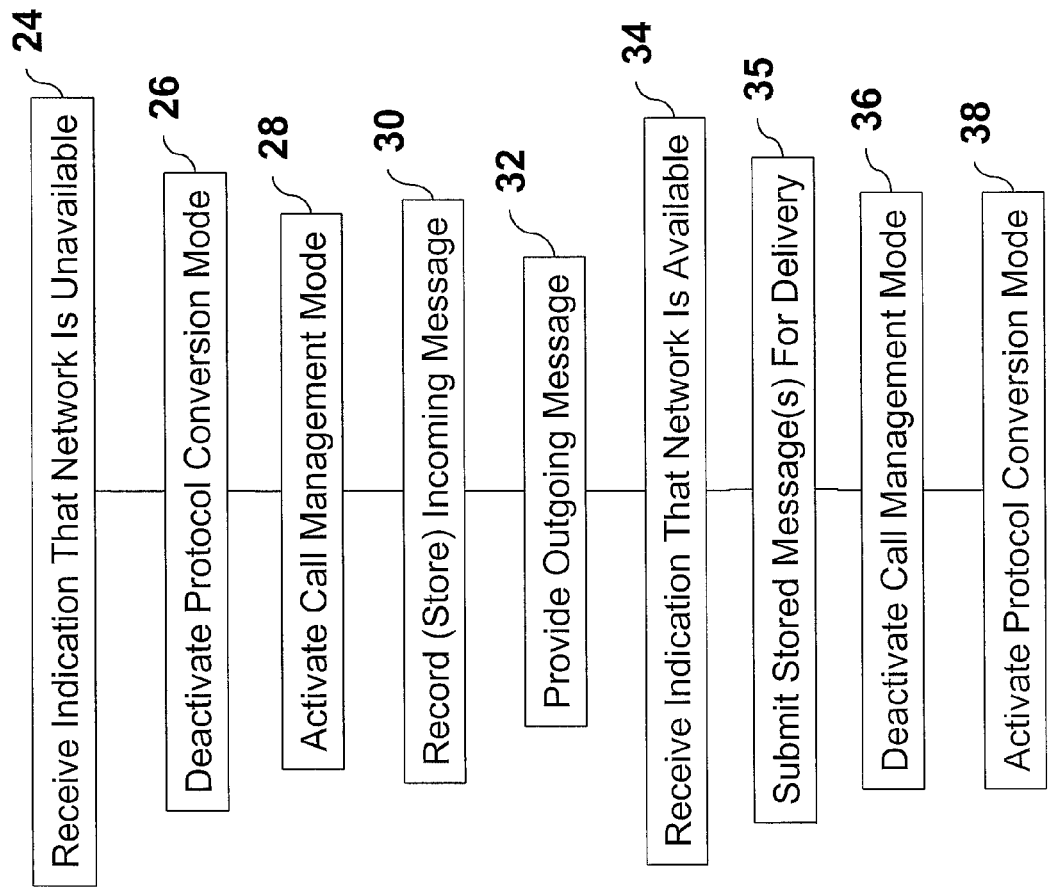
FIG. 2 is a flow diagram of an example process for processing a call utilizing a UM gateway device.

FIG. 2 is a flow diagram of an example process for processing a call. At step 24, the UM gateway device (e.g., UM gateway device 18) receives an indication that the network (e.g., network 16) connecting the UM gateway device to a UM server (e.g., UM server 14) is unavailable. The indication that the network is unavailable can be in any appropriate form. For example, the UM gateway device can monitor the connection to the network and determine that the network is unavailable in accordance with a signal thereon indicative of a voltage, indicative of an electrical current, indicative of a period of inactivity, or a combination thereof. The UM gateway device can receive an indication that the network is unavailable from a source other than the network. For example, an administrator, or the like, of a LAN at a remote location can provide a signal to the UM gateway device indicating that the network is unavailable. The administrator may do this to perform maintenance and/or diagnostic tests on the UM gateway device and/or other components of the remote location.

In response to receiving the indication that the network is unavailable, at step 26, the UM gateway device is deactivated from protocol conversion mode. That is, the UM gateway device is deactivated from performing protocol conversion. At step 28, the UM gateway device is converted to the call management mode. That is, the UM gateway device is activated to perform call management functions. While in the call management mode, the UM gateway device handles incoming calls. While in the call management mode, the UM gateway device can record incoming messages indicative of an incoming call (at step 30) and/or provide an outgoing message (e.g., prompt or announcement) to a caller (at step 32). Recording a message comprises storing a message in an appropriate location. Thus, when the network is unavailable, the UM gateway device is activated to perform at least a subset of the functions performed by the UM server when the network is available.

In an example embodiment, the UM gateway device contains, or has access to, a list of extensions or phone numbers. The extensions can be obtained (e.g., downloaded) in response to the UM gateway device receiving an indication that the network is unavailable, the extensions can be preprogrammed in the UM gateway device, and/or the extensions can be updated periodically or during the occurrence of specific events (e.g., update list of extensions when network becomes available after a period of down-time). When a call is received for one of the extensions in the list, the UM gateway device can offer a call answering dialog comprising a predetermined message, such as, for example: "At the tone, please leave a voice message for extension xxxx. Please hang up when finished." "xxxx" represents the extension that was called. Or, a message using the called-for party's name can be provided, such as, for example: "At the tone, please leave a voice message for yyyy. Please hang up when finished." "yyyy" represents the name of the called-for party (e.g., a prerecorded audio representation of the name of the called-for party). If the caller leaves a voice message, the UM gateway device can store the audio message. If a fax message is received, the fax message can be stored. Messages can be stored in any appropriate location, such as in memory within the UM gateway device and/or memory coupled to the UM gateway device. Appropriate memory can include non-volatile memory such as semiconductor memory, flash memory, magnetic memory (e.g., magnetic memory on a rotating disk), and/or optical memory (e.g., DVD, CD), or the like.

In an example embodiment, if memory for storing messages becomes unavailable (e.g., memory is full), the UM gateway device can provide an appropriate message to the caller rather than storing a message provided by the caller. An appropriate message (e.g., prompt or announcement) can include an indication that the network is unavailable and/or an indication as to where the called-for party can be reached. For example, a message can be provided to the calling party that the network is down and that the called for party can be reached at an alternate phone number (e.g., mobile phone number) and/or an email address.

The message indicative of the status of the network and/or an indication how to reach the called-for party need not be provided only when memory is unavailable. For example, a message indicative of the status of the network and/or an indication how to reach the called-for party can be provided after a predetermined number of calls is received. In another example embodiment, a message indicative of the status of the network and/or an indication how to reach the called-for party can always be provided. Thus, while in the call management mode, the UM gateway device can provide, in response to receiving a call, a message indicating that the network is unavailable and/or an alternate way of reaching the called for party. If memory is available, the UM gateway device can also provide the request to leave a message, and record the message accordingly. When memory is no longer available, the UM gateway device can discontinue the request to leave a message.

At step 34, the UM gateway device receives an indication that the network is available. The indication that the network is available can be provided by any appropriate means. For example, the UM gateway device can monitor the connection to the network and determine that the network is available in accordance with a signal thereon indicative of a voltage, indicative of an electrical current, indicative of a period of inactivity, or a combination thereof. The UM gateway device can receive an indication that the network is available from a source other than the network. For example, an administrator, or the like, of a LAN at a remote location can provide a signal to the UM gateway device indicating that the network is available. The administrator may do this as part of performing maintenance and/or diagnostic tests on the UM gateway device and/or other components of the remote location. In response to receiving the indication that the network is available, the UM gateway device, at step 35, submits stored messages for delivery to the UM server and/or to an appropriate email address. In response to receiving the indication that the network is available, the UM gateway device converts to the protocol conversion mode by deactivating the call management mode at step 36 and activating the protocol conversion mode at step 38. In an example embodiment, if messages were stored by the UM gateway device while in the call management mode, the UM gateway device provides the stored messages to the UM server. Further, recorded messages can be erased from memory, thus allowing the ability to store subsequent messages in the event the network subsequently becomes unavailable.

Figure 3:
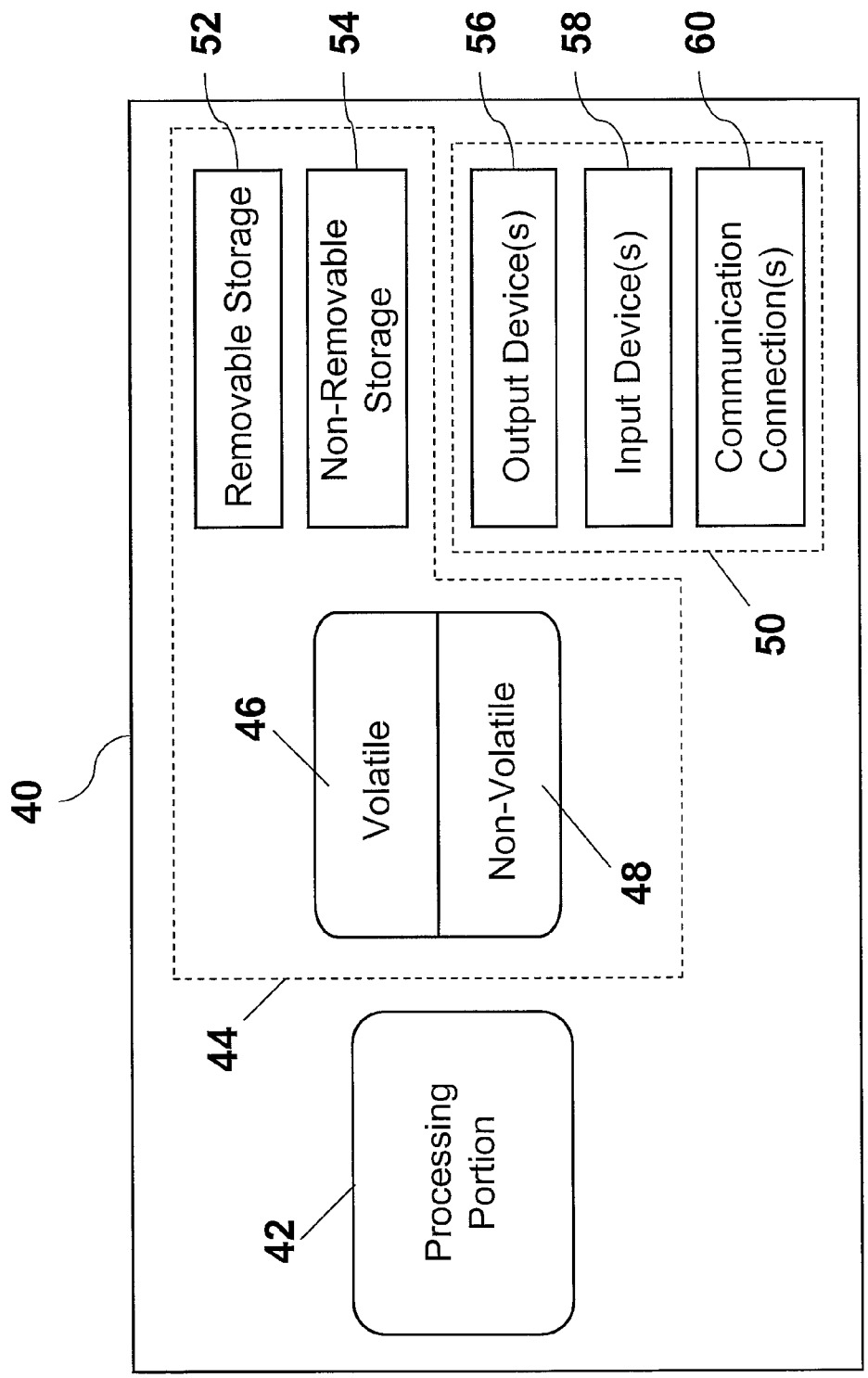
FIG. 3 is a diagram of an example UM gateway device.

FIG. 3 is a diagram of an example UM gateway device 40. The device 40 comprises a processing portion 42, a memory portion 44, and an input/output portion 50. The processing portion 42, memory portion 44, and input/output portion 50 are coupled together (coupling not shown in FIG. 3) to allow communications therebetween. The UM gateway device 40 can comprise any appropriate type of processor. For example, the UM gateway device 40 can be implemented as a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof.

The input/output portion 50 is configured to provide and/or receive components utilized to implement the UM gateway device as described above. The input/output portion 50 is configured to receive an indication that a network connecting the UM gateway device to a UM server is unavailable. The input/output portion 50 is configured to receive an indication that a network connecting the UM gateway device to a UM server is available. The input/output portion 50 is configured to provide a predetermined message in response to an incoming call. The input/output portion 50 is configured to provide a recorded messages to the UM server. The input/output portion 50 is configured to provide a indication of a recorded message to an email server. The memory portion 50 is capable of storing all information needed to implement the UM gateway device 40. For example the memory portion 50 is configured to store messages (e.g., voice messages, fax messages).

The processing portion 42 is capable of implementing functionality of the UM gateway device as described above. The processing portion 42 also is configured to convert the UM gateway device 40 from protocol conversation mode to call management mode. The processing portion 42 is configured to convert the UM gateway device 40 from call management mode to protocol conversation mode. In protocol conversion mode, the processing portion 42 is configured to perform protocol conversion such as between circuit-switched phone calls and VoIP protocols over the IP network, for example. In call management mode the processor portion 42 is configured to manage incoming calls and, in response to an incoming call, record a message indicative of the incoming call and/or provide a predetermined message. The processing portion 42 also is configured to erased recorded messages from memory. The processing portion 42 is configured to modify the outgoing message. For example, the processing portion 42 is configured to modify an outgoing message that indicates that the network is unavailable and/or an alternate way of reaching the called for party to, if memory is available, a message also requesting the caller to leave a message. Also, the processing portion 42 is configured to, when memory is no longer available, modify the outgoing message to no longer request a caller to leave a message.

The device 40 can be implemented as a stand alone device, a client processor and/or a server processor. In a basic configuration, the device 40 can include at least one processing portion 42 and memory portion 44. Depending upon the exact configuration and type of processor, the memory portion 44 can be volatile (such as RAM) 46, non-volatile (such as ROM, flash memory, etc.) 48, or a combination thereof. The device 40 can have additional features/functionality. For example, the device 40 can include additional storage (removable storage 52 and/or non-removable storage 54) including, but not limited to, magnetic or optical disks, tape, flash, smart cards or a combination thereof. Computer storage media, such as memory portion 44, 46, 48, 52, and 54, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the device 40. Any such computer storage media can be part of the device 40.

The device 40 can also contain communications connection(s) 60 that allow the device 40 to communicate with other devices. Communications connection(s) 60 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The device 40 also can have input device(s) 58 such as keyboard, mouse, pen, voice input device, touch input device, etc. Output device(s) 56 such as a display, speakers, printer, etc. also can be included.

Figure 4:
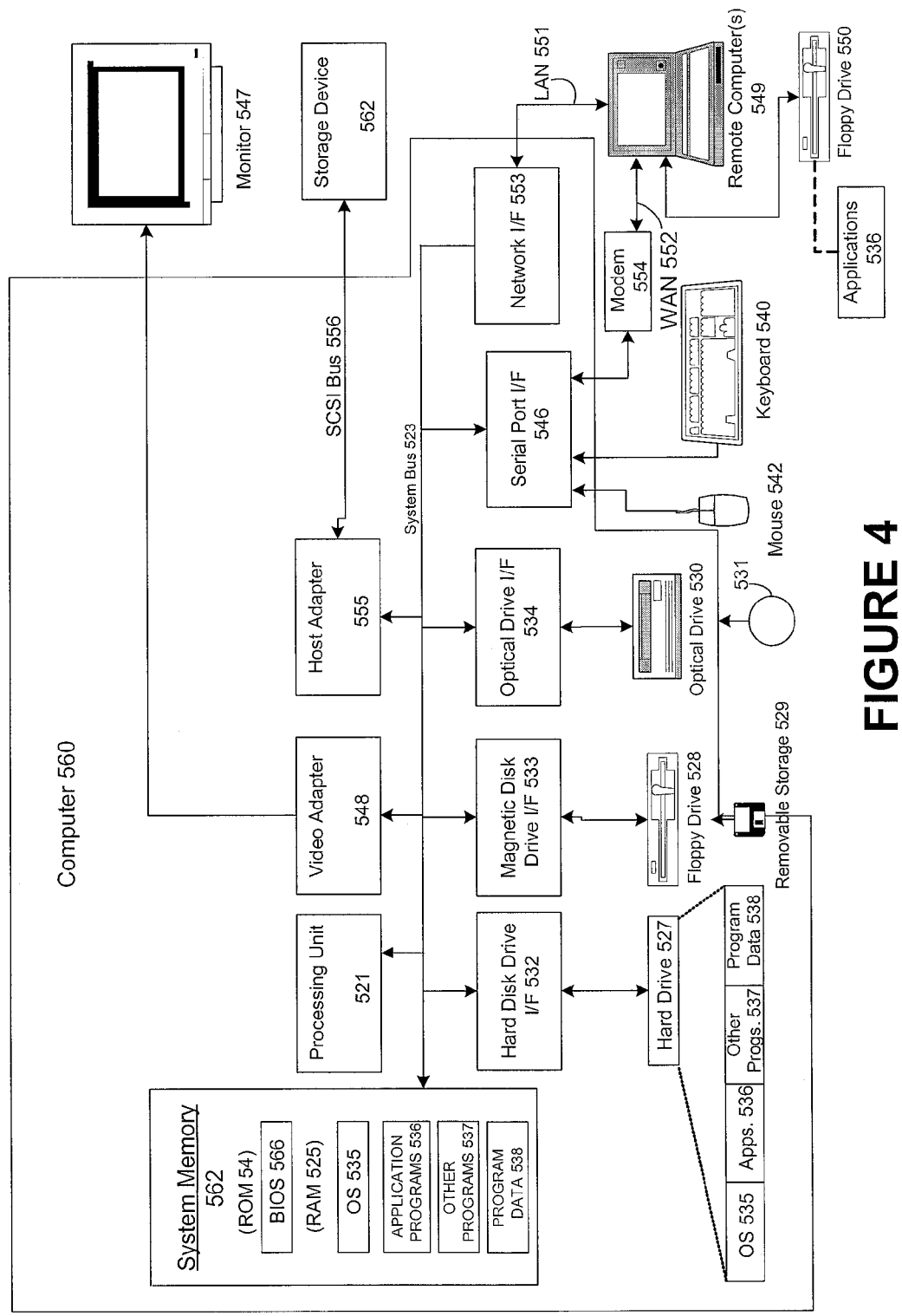
FIG. 4 is a depiction of an example computing environment in which a UM gateway device can be implemented.

FIG. 4 and the following discussion provide a brief general description of a suitable computing environment in which a UM gateway device can be implemented. Although not required, various aspects of a UM gateway device can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of a UM gateway device can be practiced with other computer system configurations, including hand held devices, multi processor systems, microprocessor based or programmable consumer electronics, network PCs, mini-computers, mainframe computers, and the like. Further, a UM gateway device also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with a UM gateway device as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 4, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 4 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 4. The logical connections depicted in FIG. 4 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of a UM gateway device are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing a UM gateway device, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a UM gateway device.

The program(s) can be implemented in assembly or machine language, if desired. In any case, the language can be a compiled or interpreted language, and combined with hardware implementations. The methods and apparatuses for implementing a UM gateway device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of a UM gateway device. Additionally, any storage techniques used in connection with a UM gateway device can invariably be a combination of hardware and software.

A UM gateway device as described above provides the ability for remote offices to be deployed utilizing a relatively simple and inexpensive appliance that, in the face of a temporary WAN outage, can survive and offer limited UM services. The UM gateway device provides the capability of a UM system without requiring the full complexity of a UM server, while supporting the full feature set of a UM server. For example, the UM gateway device provides UM services such as access to user mailboxes and call answering. The UM gateway device also provides means for providing messages to the UM system upon recovery of the network. Thus, the UM gateway device can provide a VoIP gateway supporting a limited call answering scenario and/or more complex call answering scenarios.

While a UM gateway device has been described in connection with the example embodiments of the various figures, it is to be understood that other similar embodiments can be used or modifications and additions can be made to the described embodiments for performing the same functions of a UM gateway device without deviating therefrom. Therefore, a UM gateway device as described herein should not be limited to any single embodiment, but rather should be construed in breadth and scope in accordance with the appended claims.

What is claimed:

1. A method for processing a call, the method comprising:
receiving, by a gateway device configured to perform protocol conversion, an indication that a network connecting the gateway device to a Unified Messaging (UM) server is unavailable;
in response to the indication that the network is unavailable:
deactivating the gateway device to perform protocol conversion;
activating the gateway device to manage incoming calls, the managing comprising transmitting a message in response to an incoming call, the message indicating that the network is unavailable, and further indicating where a called-for individual can be reached; the gateway device providing a request to leave a message; recording messages until memory therefore is unavailable; and thereafter discontinuing providing the request to leave a message.

2. A method in accordance with claim 1, further comprising:
receiving, by the gateway device, an indication that the network is available;
in response to the indication that the network is available:
deactivating the gateway device to manage incoming calls; and
activating the gateway device to perform protocol conversion.

3. A method in accordance with claim 2, further comprising, in response to the indication that the network is available, providing to the UM server, each message recorded in response to one or more incoming calls when the network was unavailable.

4. A method in accordance with claim 3, further comprising, in response to the indication that the network is available, erasing each message recorded in response to the one or more incoming calls.

5. A method in accordance with claim 1, further comprising providing an indication of a recorded message to an email server.

6. A method in accordance with claim 1, wherein protocol conversion comprises converting between a protocol compatible with an office telephone switch protocol and a VoIP protocol.

7. A gateway device for processing a call, the gateway device comprising:
an input/output portion configured to:
receive an indication that a network connecting the gateway device to a Unified Messaging (UM) server is unavailable; and provide a request to leave a message;
a processing portion configured to:
convert the gateway device from protocol conversion mode to call management mode upon receiving the indication, wherein:
in protocol conversion mode the gateway device is configured to perform protocol conversion; and
in call management mode the gateway device is configured to manage incoming calls, the call management mode comprising transmitting a message in response to an incoming call, the message indicating that the network is unavailable, and further indicating where a called-for individual can be reached; record messages until memory therefore is unavailable; and thereafter discontinue providing the request to leave a message; and
a memory portion configured to store recorded messages associated with one or more incoming calls during the call management mode.

8. A device in accordance with claim 7, wherein:
the input/output portion is further configured to:
receive an indication that the network is available; and
the processing portion is further configured to:
in response to the indication that the network is available, convert the gateway device from call management mode to protocol conversion mode.

9. A device in accordance with claim 8, the input/output portion further configured to, in response to the indication that the network is available, provide to the UM server, each message recorded during the call management mode.

10. A device in accordance with claim 8, the processing portion further configured to, in response to the indication that the network is available, erase from the memory portion each recorded message.

11. A device in accordance with claim 7, the input/output portion further configured to provide an indication of a recorded message to an email server.

12. A device in accordance with claim 7, wherein protocol conversion comprises converting between a protocol compatible with an office telephone switch protocol and a VoIP protocol.

13. A device in accordance with claim 7, wherein the memory portion comprises at least one of a semiconductor memory, a flash memory, a magnetic memory, and an optical memory.

14. A computer-readable medium that is not a transient signal, the computer-readable medium having stored thereon computer-executable instructions for processing a call by performing the steps of:
causing a gateway device configured to perform protocol conversion to receive an indication that a network connecting the gateway device to a Unified Messaging (UM) server is unavailable;
in response to the indication that the network is unavailable:
deactivating the gateway device to perform protocol conversion; and
activating the gateway device to manage incoming calls, the managing comprising transmitting a message in response to an incoming call, the message indicating that the network is unavailable, and further indicating where a called-for individual can be reached; causing the gateway device to provide a request to leave a message; recording messages until memory therefore is unavailable; and thereafter discontinuing providing the request to leave a message.

15. A method in accordance with claim 1, wherein indicating where a called-for individual can be reached comprises a message indicating an alternate telephone number.

16. A method in accordance with claim 15, wherein the alternate telephone number is a mobile phone number.

* * * * *